COLOR VIDEO SIGNAL GENERATING APPARATUS

Filed June 13, 1967 2 Sheets-Sheet 1

INVENTOR.
TOSHIRO WATANABE
BY
ATTORNEY

INVENTOR.
TOSHIRO WATANABE
BY Lewis H. Eslinger
ATTORNEY

United States Patent Office
3,526,706
Patented Sept. 1, 1970

3,526,706
COLOR VIDEO SIGNAL GENERATING APPARATUS

Toshiro Watanabe, Zushi-shi, Kanagawa-ken, Japan, assignor to Sony Corporation, Tokyo, Japan, a corporation of Japan Filed June 13, 1967, Ser. No. 645,727
Claims priority, application Japan, June 15, 1966, 41/38,672
Int. Cl. H04n 9/24
U.S. Cl. 178—5.4 13 Claims

ABSTRACT OF THE DISCLOSURE

In a color video signal generating apparatus employing a single image pickup tube, an assembly of parallel cylindrical lenses is disposed in front of the face plate of the pickup tube with the longitudinal axes of such lenses at a substantial angle, for example, perpendicular, to the scanning direction of the tube, a filter constituted by a simple pattern of filter elements having different wavelength band characteristics in the form of stripes parallel to the cylindrical lenses is disposed in front of the cylindrical lens assembly so that light from an object to be televised passes through the filter elements and is separated into a plurality of color components, and a camera or objective lens is interposed between the filter and cylindrical lens assembly to focus a real image of the object at the plane containing the focus points of the cylindrical lenses so that the portion of such image corresponding to each cylindrical lens is projected as separated color images on the photoconductive layer of the tube to obtain from the latter dot-sequential color video signals.

This invention relates to a color video signal generating apparatus which produces sequential color video signals corresponding to the color components of an object to be televised.

Conventional color television cameras generally employ three image pickup tubes, and the light from an object to be televised is separated, as by dichroic mirrors or other optical means, into three color primaries which are picked up by the respective pickup tubes to produce color video signals. However, these conventional color television cameras employing three image pickup tubes are inherently bulky and require complicated circuit connections in association therewith.

Color television cameras have also been proposed, for example, in United States Patent No. 3,300,580, in which light from an object to be televised is separated into color components by a filter having strip filter elements and being placed in front of a single image pickup tube, and in which there is obtained from such pickup tube a composite color signal composed of a non-modulated video signal and a video signal modulated by the strip filter elements. Such a construction permits miniaturization of the camera and simplification of its circuit connections, but fabrication of the filter presents a problem as it requires precise arrangement of, for example 250 strips on a small glass plate, and hence color television cameras of this type are not suited for mass-production.

Accordingly, it is an object of the present invention to provide a color video signal generating apparatus which employs a single image pickup tube and is relatively easy and inexpensive to manufacture.

Another object is to provide an apparatus for generating color video signals which can be easily separated into signals corresponding to each of the several color components of the object being televised.

In accordance with an aspect of this invention, a lens screen constituted by an assembly of parallel cylindrical lenses is disposed in front of the face plate of a single image pickup tube with the longitudinal axes of the lenses disposed perpendicular to the scanning direction of the tube, and a filter constituted by a relatively simple pattern of filter elements of different wavelength band pass characteristics in the form of stripes paralleling the longitudinal axes of the cylindrical lenses is disposed in front of the lens screen, light from an object to be televised being separated into color components on passage through the filter and a real image of the object being focused at the plane containing the focus points of the cylindrical lenses so that each cylindrical lens separates a respective portion of the image into color images projected on the photoconductive layer of the image pickup tube, whereby, when such layer is scanned in the usual manner, there is obtained a dot-sequential color video signal.

According to another feature of the invention there is provided an opaque region for the filter, and preferably also one or more light sources, to obtain a marker signal at a predetermined position in each cycle of the dot-sequential color video signal for avoiding incorrect decoding of the respective color signals in the event that one or more of the separated color components is absent from the portion of the image projected on any of the cylindrical lenses.

The above, and other objects, features and advantages of the invention, will be apparent in the following detailed description of illustrative embodiments thereof which is to be read in connection with the accompanying drawings, wherein.

Figures 1, 2, 3, 4:
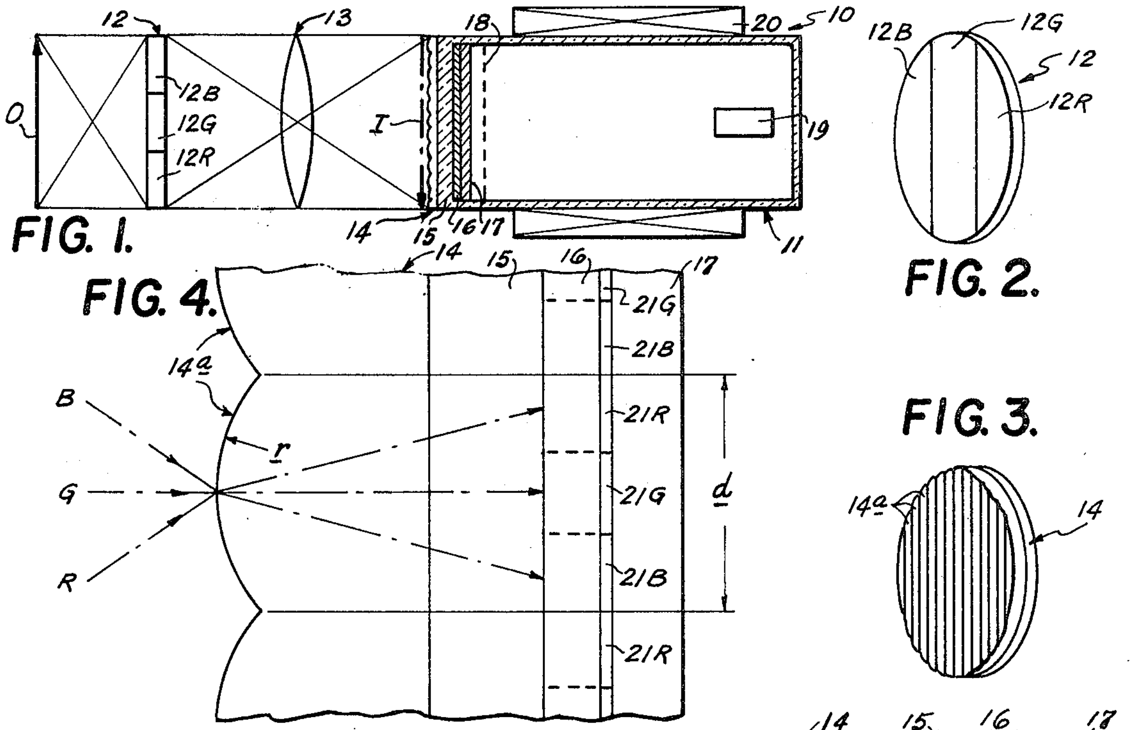
FIG. 1 is a schematic top plan view, partly in section, of a color video signal generating apparatus in accordance with one embodiment of this invention.
FIG. 2 is a perspective view schematically illustrating a color filter employed in the apparatus of FIG. 1.
FIG. 3 is a perspective view schematically illustrating a lens screen included in the apparatus of FIG. 1.
FIG. 4 is an enlarged schematic view illustrating the color separation effected by each cylindrical lens of the lens screen included in the apparatus of FIG. 1.

Referring to the drawings in detail, and initially to FIG. 1 thereof, it will be seen that an apparatus 10 for generating color video signals in accordance with this invention generally comprises a single image pickup tube 11, for example, in the form of a vidicon tube, a banded color filter 12, a camera or objective lens 13 and a lens screen 14.

Tube 11 is shown to include the usual face plate 15 having a transparent electrode 16 on its inner surface which, in turn, is covered by a photoconductive layer 17, for example, formed of PbO. A mesh electrode 18 is located within the envelope of tube 11 adjacent photoconductive layer 17, and an electron gun device 19 is located adjacent the end of the envelope remote from face plate 15 to emit an electron beam which is focused on photoconductive layer 17 and made to scan the surface of the latter by means of a beam deflection arrangement indicated at 20. Conventional electronic components (not shown) which form no part of this invention are connected with tube 11 in the usual manner to effect scanning of layer 17 and to receive and utilize signals from electrode 16, which signals represent the object O to be televised. As is usual, scanning of layer 17 may be effected by horizontally oscillating the electron beam and successively vertically displacing the beam with its successive oscillations so that the entire useful area of photoconductive layer 17 is cyclically covered by a series of the horizontal oscillations.

As shown on FIG. 2 the banded color filter 12 which may be employed in an apparatus in accordance with this invention consists of a simple pattern of color filter elements 12B, 12G and 12R of different wavelength band pass characteristics, for example, corresponding to blue, green and red colors, respectively, and which are contiguous to each other with generally parallel lines of separation therebetween, for example, as are achieved when the color filter elements are in the form of parallel, contiguous stripes. As shown on FIG. 1, color filter 12 is disposed at a predetermined location spaced forwardly from face plate 15 and lies in a plane parallel to the latter with the lines of separation between filter elements 12B, 12G and 12R extending vertically, that is, at right angles to the horizontal scanning direction on photoconductive layer 17.

The lens screen 14 provided in accordance with this invention consists of an assembly of a relatively large number, for example, 200, of cylindrical lenses 14*a*, which are referred to as "lenticules" and arranged at regular intervals with their longitudinal axes extending parallel to each other, as shown on FIGS. 3 and 4. The cylindrical lenses 14*a* making up lens screen 14 may be conveniently formed integral with each other, as by suitably molding the lens screen as a unit, for example, from glass, acrylic resin or the like. The lens screen 14 thus formed is secured to the front surface of face plate 15 by a suitable adhesive binder, with such lens screen being disposed so that the longitudinal axes of its cylindrical lenses 14*a* extend parallel to the lines of separation or stripes of color filter elements 12B, 12G and 12R. Of course, it is possible to form the lenticules or cylindrical lenses 14*a* directly on face plate 15 of tube 11, but such arrangement is not as practical, in terms of its manufacture, as the illustrated arrangement employing a separately formed lens screen 14 secured to the face plate.

The camera or objective lens 13 interposed between color filter 12 and lens screen 14 is shown schematically as a simple, single element, but, in practice, a multi-element lens is employed for achieving the desired optical performance characteristics. The camera lens 13 is designed to focus, at the plane containing the focus points of cylindrical lenses 14*a*, a real image I of the object O which is to be televised.

The width *d* and the curvature *r* (FIG. 4) of each of cylindrical lenses 14*a*, the width of color filter 12, that is, the dimension thereof measured across elements 12B, 12G and 12R, and the focal length of camera lens 13 are selected so that an image of color filter 12 is focused on photoconductive layer 17 at each portion of the latter corresponding to a cylindrical lens 14*a*. Thus, the light from object O directed to each cylindrical lens 14*a* is separated into color components B, G and R by color filter elements 12B, 12G and 12R and the portion of the real image I of the object corresponding to each cylindrical lens 14*a* is projected onto a portion of photoconductive layer 17 disposed in back of the respective cylindrical lens in the form of color images 21R, 21G and 21B which are separated or displaced relative to each other in the horizontal scanning direction, that is, at right angles to the axes of the cylindrical lenses, as shown on FIG. 4. In practice, the best focus position for lens 13 may be determined by photographic tests.

Figure 5A:
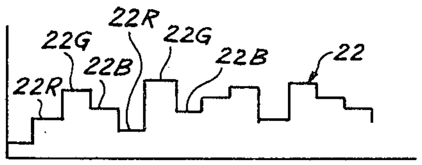
FIGS. 5A to 5F are diagrammatic representations of color signal wave forms obtainable with apparatus according to various embodiments of this invention.

It will be apparent that, when the electron beam emitted by device 19 is deflected horizontally, that is, in a direction across the axes of cylindrical lenses 14*a*, so as to scan photoconductive layer 17, there is obtained from electrode 16 a dot-sequential color video signal 22, as depicted on FIG. 5A, which signal consists of red, green and blue color signals 22R, 22G and 22B appearing in a repeating cyclic order and corresponding to the separated color images 21R, 21G and 21B projected on photoconductive layer 17 at the portions of the latter corresponding to the locations of the several cylindrical lenses 14*a*.

In order to indicate the reference position or commencement of each cycle of the dot-sequential color video signal obtained from electrode 16, it is desirable, in practice, to incorporate a black level which results in marker signals interposed between successive cycles of the dot-sequential color video signal.

Figure 5B:
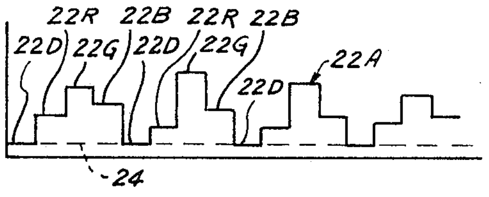
Figure 5C:
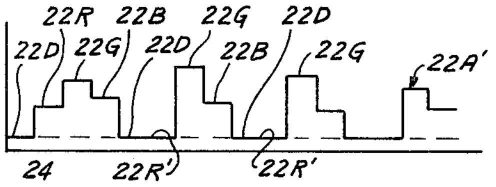

Marker signals between the successive cycles of the dot-sequential color signals, may be obtained by employing a color filter 12A (FIG. 6) which has an opaque region 23 surrounding its color filter elements 12B, 12G and 12R. When color filter 12A is employed, the shadow of its opaque region 23 is cast on photoconductive layer 17 at positions corresponding to the demarcations or boundaries between adjacent cylindrical lenses 14A. As a result of such shadow, the dot-sequential color video signal 22A (FIG. 5B) emanating from electrode 16 includes black signals 22D at the beginning and end of each cycle of the dot-sequential color signal, which black signals 22D are always equal to the black level 24 and can be utilized as marker signals to identify the beginning and end of each cycle. However, as shown on FIG. 5C, when one or more of the color components, for example, the red color component, is not present in the light directed from the object to be televised to one or more of cylindrical lenses 14A, each of the corresponding cycles of the dot-sequential color video signal 22A′ is composed of green and blue color signals 22G and 22B, while the interval that would be normally occupied by the red color signal 22R′ is at the same level as the preceding black signal 22D. Thus, the first signal that can be detected after the marker signal 22D at the black level 24 is the green color signal 22G rather than the red color signal 22R and there is the possibility that, in decoding the dot-sequential color video signal 22A′, the green color signal 22G will be incorrectly decoded or interpreted as indicating a red color image.

The above mentioned possibility of incorrect decoding of the signals when the portion of the image separated by one or more of cylindrical lenses 14A does not include all of the color components can be avoided by providing an elongated, narrow light source interposed in the optical path between the object O and lens screen 14 so as to extend either parallel, or at right angles to the stripes defined by the color filter elements. For example, as shown on FIG. 7, a color filter 112 employed in accordance with this invention may include an elongated, narrow light source 25 disposed in its opaque region 23 and extending parallel to the stripes of its color filter elements 12B, 12G and 12R. When light source 25 extends parallel to the filter elements, it is preferred that light source 25 be surrounded by opaque region 23, that is, separated from the color filter elements by a portion of the opaque region, so that the color signals representing object O are not adversely affected by the light from source 25. Such adverse effect on the color signals by light from the source 25 can be avoided, even when the light source, opaque region and filter elements do not lie in a common plane so long as the opaque region 23 is positioned relative to the light source 25 in the direction at right angles to the plane of the color filter 112 so as to separate the light source from the filter elements, that is, so long as they do not overlap one another in that direction. Thus, although opaque region 23 and light source 25 are shown on FIG. 7 as being parts of color filter 112 along with the filter elements thereof, the opaque region may be defined by an opaque plate separate from the color filter, and the light source 25 may also be separate from the color filter so that, in such case, the color filter, the opaque plate and the light source may be shifted relative to each other. The light source 25 can be conveniently constituted by, for example, electroluminescent material which is suitably energized or by a plurality of miniature lamps arranged in a row. Where the light source is constituted by a row of miniature lamps, light from the latter is made linear in passing through the lenticules or cylindrical lenses 14A, whereby the same results are achieved as with a light source constituted by an elongated and narrow stripe of electroluminescent material.

Figures 6, 7, 8, 9, 10:
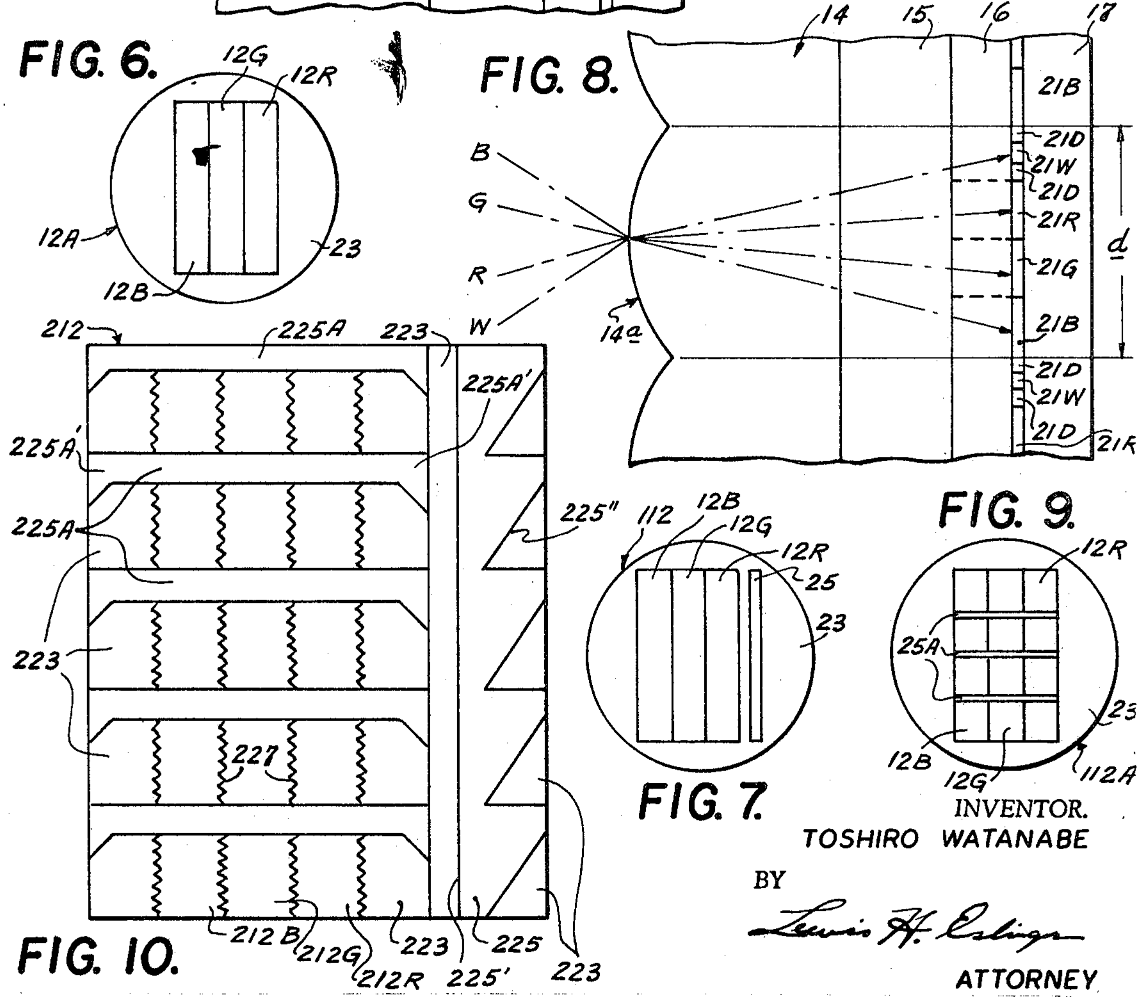
FIGS. 6 and 7 are front elevational views of color filters included in color video signal generating apparatus in accordance with two other embodiments of this invention.
FIG. 8 is a view similar to that of FIG. 4, but illustrating the color separation effected in an apparatus that includes the color filter of FIG. 7.
FIG. 9 is a front elevational view of a color filter in accordance with another embodiment of this invention.
FIG. 10 is an enlarged front elevational view showing a color filter in accordance with still another embodiment of the invention.
Figure 5D:
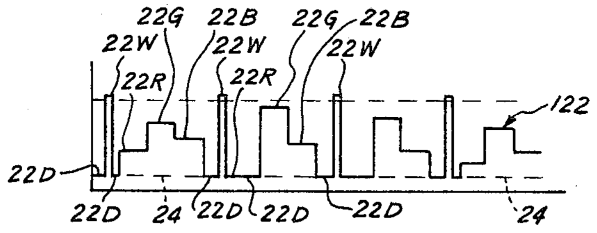

When the arrangement described above with reference to FIG. 7 is employed in a color video signal generating apparatus in accordance with this invention, there are sequentially formed, on the portion of photoconductive layer 17 corresponding to each cylindrical lens 14*a*, separated images in the order 21D, 21W, 21D, 21R, 21G, 21B and 21D, which images respectively correspond to opaque region 23, light source 25, opaque region 23, the light component R passing through red filter element 12R, the light component G passing through green filter element 12G, the light component B passing through blue filter element 12B, and the opaque region 23, as illustrated on FIG. 8. As a result of such separated images, the dot-sequential color video signal 122 (FIG. 5D) emanating from electrode 16 includes black, white, red, green and blue signals 22D, 22W, 22R, 22G and 22B, respectively, appearing in the repeating cyclic order 22D, 22W, 22D, 22R, 22G and 22B. Therefore, by selecting the uniform level of white signals 22W so that the same are always higher than the red, green and blue signals 22R, 22G and 22B, white signals 22W can be separated or distinguished from the other color signals and can be used as marker signals.

Since light source 25 is made narrow or linear each white image 21W is relatively narrow with respect to the color component images 21R, 21G and 21B (FIG. 8). Thus, marker signals 22W can be separated or distinguished from the color signals by a band-pass filter of a frequency corresponding to the relatively small pulse width of the marker signals and, in that case, the level of the marker signals 22W need not be higher than the levels that can be attained by color signals 22R, 22G and 22B. When the image 21W resulting from the light source is relatively narrow with respect to color images 21R, 21G and 21B, and thus produces a marker signal distinguishable from the color signals by a suitable band pass filter, the light source 25 can be partially superimposed on the filter elements of color filter 112. In any case, the marker signals 22W resulting from the light source are always interposed at a predetermined position in each repeating cycle of the dot-sequential color video signal, and thereby avoid the possibility that one color signal may be decoded as the color signal which precedes it in the usual order in the event that such preceding color signal is at the black level.

Although a single light source 25 is shown on FIG. 7, a plurality of parallel light sources can be employed to obtain a corresponding plurality of white signals which can be used as marker signals.

Further, although light source 25 is shown on FIG. 7 to be arranged in parallel with the stripes of the color filter elements and gives rise to distinct white signals 22W to be used as marker signals, it is to be understood that a light source or sources can be arranged to extend across the color filter elements for producing a bias light, which may be due to light emissions from the electroluminescent material if it is utilized as the light source 25, or from the plurality of miniature lamps arranged in a row configuration if they are utilized as the light source 25, the light emissions illuminating the photoconductive layer 17, and when the light source or sources are so arranged, black signals resulting from an opaque region of the filter can be used as marker signals for identifying the repeating cycles of the dot-sequential color video signal. Thus, as shown on FIG. 9, a plurality of parallel light sources 25A may be arranged to extend across the stripes of filter elements 12B, 12G and 12R of a color filter 112A. Light sources 25A are spaced apart so as to be at uniform intervals along the filter elements. An opaque region 23 is provided at least at one side of the array of filter elements, that is, either alongside filter element 12B or alongside filter element 12R. Further, as in the case of the arrangement described above with reference to FIG. 7, opaque region 23 and light sources 25A must be disposed relative to each other and to the filter elements of color filter 112A in the direction perpendicular to the plane of such filter elements so that the color signals representing the object to be televised are not adversely affected by light from sources 25A. To achieve the foregoing, the filter elements of color filter 112A, opaque region 23 and light sources 25A may be slightly shifted or displaced relative to each other in the direction perpendicular to the plane of the filter elements.

Figure 5E:
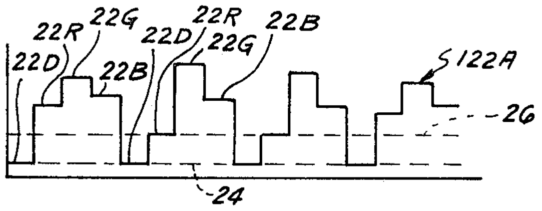
Figure 5F:
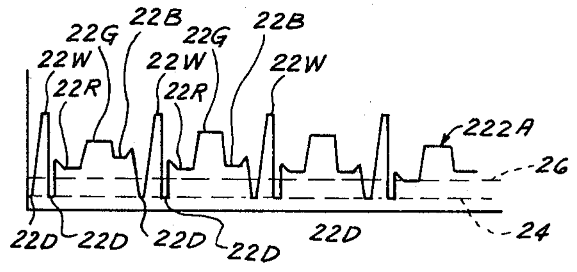

With the arrangement shown on FIG. 9, light from sources 25A is scattered on photoconductive layer 17 to provide a substantially uniform bias light over all areas of photoconductive layer 17 other than those areas receiving black images of the opaque region 23. Thus, when the arrangement of FIG. 9 is employed, the dot-sequential color video signal 122A derived from electrode 16 (FIG. 5E) has the level of each of its color signals 22R, 22G and 22B increased by the level 26 of the bias light. If a color signal is absent from any cycle of the dot-sequential color video signal, for example, as at the location 22R in the second cycle on FIG. 5E, the level of the signal during the corresponding interval is merely reduced to the level 26 of the bias light and therefore is readily distinguished from the black signal 22D at the relatively lower black level 24. Consequently, the black signals 22D can be employed as marker signals to identify the successive cycles of the sequential signal without the danger that synchronization will be lost and a green signal will be decoded as a red signal.

It is also possible, in an apparatus according to this invention, to provide light sources which extend both parallel to and across the stripes of the color filter elements. For example, as shown on FIG. 10, a color filter 212 is provided with filter elements 212B, 212G and 212R arranged in parallel stripes and with an opaque region 223 along at least one side of the array of filter elements, that is, along either filter element 212B or filter element 212R, or along both sides of the array of filter elements, as shown. A light source 225 is provided in opaque region 223 to extend parallel to the direction of the strips of the filter elements and is separated from the latter by a portion of the opaque region, and a plurality of parallel light sources 225A are provided to extend across the stripes of the filter elements at regular intervals along the latter.

When the color filter 212 is employed in apparatus in accordance with this invention, the dot-sequential color video signal that is obtained includes, in each cycle, in the following order, a black signal 22D, a white signal 22W resulting from a white image of light source 225, a black signal 222D and color signals 22R, 22G and 22B, with the level of each of the signals 22W, 22R, 22G and 22B being increased by the level 26 of the bias light resulting from light sources 225A. Thus, the difference in level between the black signals 22D and the adjacent white signals 22W is very substantial and such difference can be employed as a marker signal which can be easily separated from the other signals, as by differentiation, so as to identify the successive cycles of the dot-sequential color video signal.

Further, as shown on FIG. 10, the longitudinal edge 225' of light source 225 which is closest to the color filter elements is rectilinear and extends parallel to the direction of the stripes constituting the filter elements, and the other marginal edge 225'' of light source 225 has an undulating or saw-tooth configuration. It will also be seen that the opposite end of each of the light sources 225A are of increased width, as at 225A'.

As a result of the above-described specific configuration of light sources 225 and 225A, each white signal 22W resulting from light source 225 rises gradually to its maximum level and then abruptly decays while the level at the leading and trailing edges of the signals based upon the light sources 225A is higher than the level at the intermediate portions of such signals, so that the decaying of the white signal 22W can be easily distinguished. Further, the boundaries between the adjoining color filter elements 212B, 212G and 212R can be of zig-zag configuration, as at 227, thereby to reduce the rate of change of the signal between the successive color signals 22R, 22G and 22B.

As in the embodiments previously described with reference to FIGS. 7 and 9, light sources 225 and 225A, filter elements 212B, 212G and 212R, and opaque regions 223 may be displaced relative to each other in the direction perpendicular to the plane of color filter 212 so as to avoid affecting of the color signals 22R, 22G and 22B as representations of the object to be televised by reason of light from sources 225 and 225A.

Even though light sources 225 and 225A are of relatively small size and relatively complicated in shape, such light sources can be easily constituted by electro-luminescent materials.

In the above description of illustrative embodiments of this invention, the possibility of obtaining color video signals with a single image pick-up tube has been emphasized, but it should be noted that the described apparatus 10 including the pick-up tube 11 can be combined with another type of luminance signal generating pick-up tube to provide color video signals of high resolution.

Further, in the foregoing description, lens screen 14 has been referred to as being a part of, or attached directly to face plate 15 of the image pickup tube. However, it is possible to space lens screen 14 from face plate 15 and to provide therebetween an optical transmission device made up of a large number of optical fibers which, at one end, are engaged with the back surface of lens screen 14 and, at their other end, are either engaged with face plate 15 or spaced from the latter with a suitable relay lens therebetween.

It is to be understood that the above described embodiments of the invention are merely illustrative of the principles thereof and that numerous modifications and embodiments of the invention may be derived within the spirit and scope thereof.

What is claimed is:

1. A color video signal generating apparatus comprising image pickup means for the photoelectro conversion of images projected thereon into electrical output signals, said image pickup means including an image pickup tube having a photoconductive layer, means emitting an electron beam toward said layer and deflection means operative to cause scanning of said layer by said beams; a banded color filter interposed between an object to be reproduced and said image pickup means and having filter elements of different wavelength band pass characteristics to respectively transmit light of different wavelength ranges; a plurality of cylindrical lenses arranged with their longitudinal axes extending parallel to each other and being disposed between said image pickup means and said color filter, said cylindrical lenses coacting with said color filter to project onto corresponding areas of said photoconductive layer separated color images in said different wavelength ranges from respective portions of an image of the object to be reproduced, said scanning of said layer being in directions at right angles to said longitudinal axes of the cylindrical lenses so that the output of said tube is a dot-sequential color video signal consisting of repeating cycles corresponding to said color images separated by the respective cylindrical lenses; and an opaque member interposed between said cylindrical lenses and the object to be reproduced and positioned to cause each of said cylindrical lenses to project onto said photoconductive layer a black image separated from the corresponding color images at a predetermined position relative to the latter, said predetermined position being indicative of the length of one cycle of the dot-sequential color video signal.

2. A color video signal generating apparatus according to claim 1; wherein said filter elements are in the form of elongated, parallel stripes arranged with their longitudinal axes parallel to said longitudinal axes of the cylindrical lenses.

3. A color video signal generating apparatus according to claim 2; wherein an objective lens is interposed between said banded color filter and said cylindrical lenses to focus a real image of the object to be reproduced at the plane containing the focus points of said cylindrical lenses.

4. A color video signal generating apparatus according to claim 3; in which said opaque member is constituted by at least one opaque portion of said color filter.

5. A color video signal generating apparatus according to claim 3; in which a light source is interposed between said cylindrical lenses and the object to be reproduced and positioned to directly cause each of said cylindrical lenses to project white light on said photoconductive layer in addition to said color images.

6. A color video signal generating apparatus according to claim 5; in which said light source is disposed at least at one portion of said color filter.

7. A color video signal generating apparatus according to claim 5 in which said light source is elongated and extends parallel to said longitudinal axes of the filter element stripes so that each of said cylindrical lenses projects onto said photoconductive layer a linear white image separated from the corresponding color images at a predetermined position relative thereto.

8. A color video signal generating apparatus according to claim 5; in which said light source is disposed to provide bias light on said photoconductive layer, thereby to raise the level of the electrical signals corresponding to said color images.

9. A color video signal generating apparatus comprising image pickup means for the photo-electro conversion of images projected thereon into electrical output signals, said image pickup means including an image pickup tube having a photoconductive layer, means emitting an electron beam toward said layer, and deflection means operative to cause scanning of said layer by said beam; a banded color filter interposed between an object to be reproduced and said image pickup means and having filter elements of different wavelength band pass characteristics to respectively transmit light of different wavelength ranges; a plurality of cylindrical lenses arranged with their longitudinal axes extending parallel to each other and being disposed between said image pickup means and said color filter, said filter elements being in the form of elongated, parallel stripes arranged with their longitudinal axes parallel to said longitudinal axes of the cylindrical lenses; said cylindrical lenses coacting with said color filter to project onto corresponding areas of said photoconductive layer separated color images in said different wavelength ranges from respective portions of an image of the object to be reproduced; said scanning of said layer being in directions at right angles to said longitudinal axes of the cylindrical lenses so that the output of said tube is a dot-sequential color video signal consisting of repeating cycles corresponding to said color images separated by the respective cylindrical lenses; an objective lens interposed between said banded color filter and said cylindrical lenses to focus a real image of the object to be reproduced at the plane containing the focus points of said cylindrical lenses; a light source interposed between said cylindrical lenses and the object to be reproduced and positioned to cause each of said cylindrical lenses to project white light on said photoconductive layer in addition to said color images; and an opaque member also interposed between said cylindrical lenses and the object to be reproduced and positioned to cause each of said cylindrical lenses to project onto said photoconductive layer a black image separated from the corresponding color images at a predetermined position relative to the latter.

10. A color video signal generating apparatus according to claim 5; in which said light source is constituted by at least one straight row of lamps.

11. A color video signal generating apparatus according to claim 5; in which said light source is constituted by at least one rectilinear stripe of electroluminescent material.

12. A color video signal generating apparatus according to claim 3; in which light sources are also interposed between said cylindrical lenses and the object to be reproduced, at least one of said light sources being elongated and positioned parallel to said filter element stripes so that each of said cylindrical lenses projects onto said photoconductive layer a linear white image separated from the corresponding black and color images at a predetermined position relative thereto, and others of said light sources extending across said filter element stripes to provide bias light on said photoconductive layer at the locations of said white and color images, thereby to accentuate the difference in level between said black signals and said white and color signals.

13. A color video signal generating apparatus according to claim 4, in which said predetermined positions correspond to demarcations between adjacent cylindrical lenses to provide a black signal at the extremities of each cycle.

References Cited

UNITED STATES PATENTS

| | | | |
|---|---|---|---|
| 2,479,820 | 8/1949 | De Voke | 178—5.2 |
| 2,769,855 | 11/1956 | Boothroyd et al. | 178—5.4 |
| 1,844,949 | 2/1932 | Farnsworth | 178—7.2 |
| 3,158,683 | 11/1964 | Waggener. | |

ROBERT L. GRIFFIN, Primary Examiner

A. H. HANDAL, Assistant Examiner